(12) United States Patent
Battey et al.

(10) Patent No.: US 6,421,494 B1
(45) Date of Patent: Jul. 16, 2002

(54) DROP CABLE STRAIN RELIEF

(75) Inventors: Jennifer A. Battey, Euless; Michael W. Canning, Dallas; James M. Carlson, Ft. Worth; William J. Cregan, Ft. Worth; Steve A. Fontaine, Ft. Worth, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/725,746

(22) Filed: Nov. 29, 2000

(51) Int. Cl.[7] ............................................. G02B 6/00
(52) U.S. Cl. .................. 385/136; 439/470; 174/40 CC
(58) Field of Search .......................... 385/136; 439/470; 174/84 R, 92, 40 CC

(56) References Cited

U.S. PATENT DOCUMENTS

| | | | | |
|---|---|---|---|---|
| 1,608,184 A | * | 11/1926 | Rumble | 174/40 CC |
| 3,526,934 A | * | 9/1970 | Owen, Sr. | 138/106 |
| 3,864,011 A | * | 2/1975 | Huber | 439/472 |
| 4,295,696 A | * | 10/1981 | Gray | 439/470 |
| 5,146,532 A | * | 9/1992 | Hodge | 385/135 |

* cited by examiner

Primary Examiner—Brian Sircus
Assistant Examiner—Brian S. Webb

(57) ABSTRACT

An apparatus is provided for strain relieving a communications cable having a non-cylindrical cross section and for optimally positioning a plurality of the cables. The apparatus includes at least two plates oriented adjacent one another. Each of the plates has at least one mounting surface and at least one strain relief surface. The strain relief surface may be angled relative to the mounting surface. At least one fastener draws the plates together to grip the cable between the strain relief surfaces. The apparatus may further include a plurality of laterally extending teeth depending from the strain relief surface of at least one of the plates. The teeth increase the gripping force applied to the cable. The cable may have an electrically conductive inner sheath that is pierced by the teeth on the strain relief surface and the apparatus may be further provided with a ground strap for grounding the cable.

16 Claims, 3 Drawing Sheets

DROP CABLE STRAIN RELIEF

FIELD OF THE INVENTION

The invention relates generally to strain relieving a cable, and more particularly, to strain relieving a communications cable having a non-cylindrical cross section, such as a flat cable or an elliptical cable.

BACKGROUND OF THE INVENTION

Communications cables typically have a cylindrical (i.e., circular) cross section. Communications cables having a cylindrical cross section can be strain relieved by a number of conventional strain relief apparatus and methods developed for clamping cylindrical hoses. Typical apparatus and methods for strain relieving cylindrical hoses include clamping the hose between a semi-circular strap and a flat plate and surrounding the hose with a hose clamp or other circular restraint that is secured to a stationary surface and tightened around the exterior of the hose.

Recently developed communications feeder and drop cables have a non-cylindrical cross section, and thus, require an apparatus and method of strain relief. The previously known strain relief apparatus and methods are effective for gripping cylindrical cables, but are less effective when used to grip cables having a non-cylindrical cross section, and in particular, flat cables and elliptical cables. Furthermore, the previously known strain relief apparatus and methods optimally position cylindrical cables, but do not provide for optimally positioning cables having a non-cylindrical cross section. The major axis dimension of flat cables and elliptical cables limits the number of cables that can be laid side-by-side in a planar orientation on a strain relief apparatus having a predetermined lateral dimension. In particular, the number of cables that can be positioned in a planar orientation is limited by the distance between the fasteners used to apply the compressive force to the cables or by the dimensions of the base of the enclosure in which the cables are strain relieved.

BRIEF SUMMARY OF THE INVENTION

An apparatus is provided for strain relieving a cable having a non-cylindrical cross section. The apparatus includes at least two adjacent plates, each of the plates having at least one mounting surface and at least one strain relief surface. The strain relief surface may be angled relative to the mounting surface. Fasteners draw the plates together to grip the cable between the opposed strain relief surfaces of the adjacent plates. In addition to strain relieving cables having a non-cylindrical cross section, the apparatus optimally positions the cables to increase the number of cables that can be positioned on an apparatus having a predetermined lateral dimension or within the dimensions of the base of an existing enclosure.

The invention includes several embodiments of the apparatus. The plates may have one or more mounting surfaces and one or more strain relief surfaces. The plates may have a mechanical stop located between each pair of opposed mounting surfaces. The stops maintain a minimum distance between the strain relief surfaces, and thereby prevent the cables from being crushed and damaged in the event that the fasteners are over-tightened.

In an alternative embodiment, the plates each have a flat base surface that functions as both a mounting surface and a strain relief surface. Similarly, the plates each have mechanical stops that abut the underside of the base surface of the adjacent plate.

In yet another alternative embodiment, each plate has a plurality of laterally extending teeth provided on the lengthwise edges of the strain relief surfaces or the base surfaces. The teeth grip the cable securely therebetween and, in addition, may ground a cable having an electrically conductive inner sheath.

In each embodiment, a plurality of plates may be assembled together to strain relieve more cables than can be accommodated between only two adjacent plates. If so, assembled, each fastener will pass through a mounting surface of each of the plurality. of plates to secure the cables between the plates.

DETAILED DESCRIPTION OF PREFERRED EMBODIMENTS OF THE INVENTION

FIGS. 1 through 6 show alternative preferred embodiments of an apparatus for strain relieving a communications cable 11 having a non-cylindrical cross section. As shown in the figures, cable 11 is a fiber optic feeder or drop cable having a generally elliptical cross section.

However, the invention is not so limited and cable 11 may be any type of communications cable, such as an electrical conductor or composite feeder or drop cable, or buffer tube. Each end of the cable 11, defined by the major axis dimension, is curved and the sides of the cable, defined by the minor axis dimension, may be curved (as shown) or flat. Each cable 11 has a jacket or outer sheath 13 and a plurality of lengthwise optical fibers 15 contained within the outer sheath 13.

Figure 1:
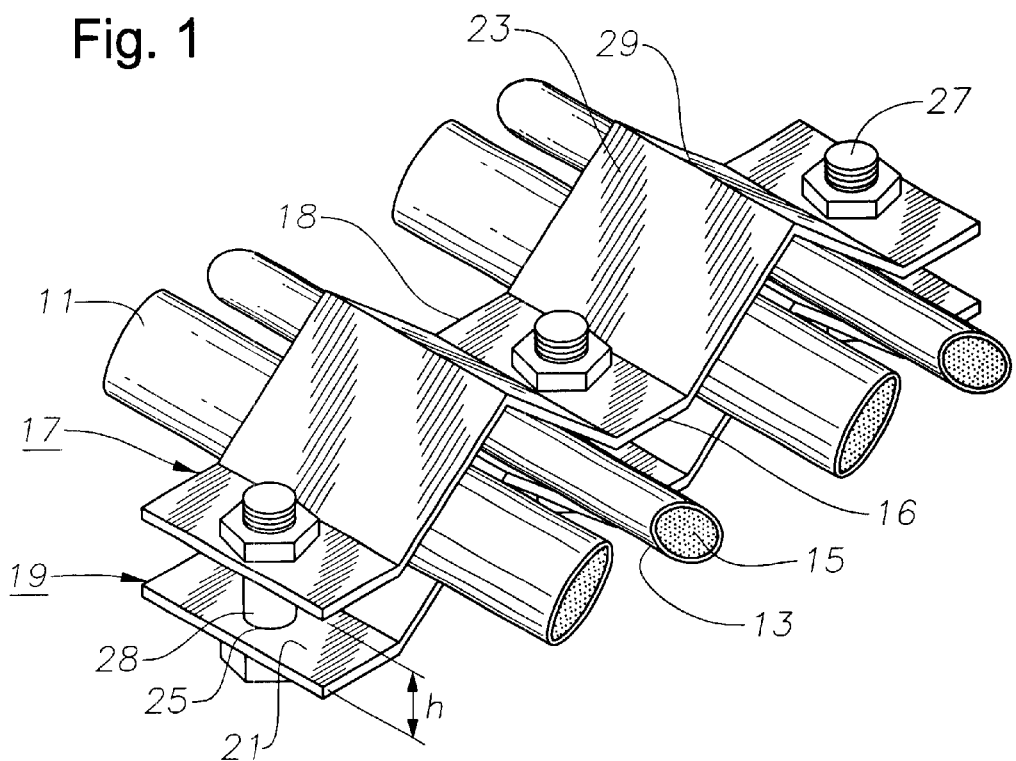
FIG. 1 is a perspective view of a first embodiment of a strain relief apparatus constructed in accordance with the invention.

Referring to FIG. 1, a first embodiment of a strain relief apparatus according to the invention comprises an upper plate 17 and a lower plate 19, the plates 17, 19 being oriented adjacent one another. Plates 17, 19 are preferably made of formed metal, such as thin gauge sheet metal, but may be made of any rigid material, for example, hard plastic. As shown, plates 17, 19 have an identical structural configuration and are formed to have three mounting surfaces 21 and four strain relief surfaces 23. Mounting surfaces 21 are generally coplanar, and each mounting surface 21 has a hole 25 formed therethrough at an interior location on mounting surface 21 for receiving a fastener 27. Fastener 27 is preferably an externally threaded bolt and internally threaded nut, but may by any suitable mechanical fastener, such as an internally threaded shaft and externally threaded screw or a snap fitting. Alternatively, fastener 27 may be a conventional cable wrap or cable tie.

Strain relief surfaces 23 are arranged in adjoining pairs, each pair comprising two generally flat strain relief surfaces 23 oriented in angled planes that intersect each other to define a lengthwise peak 29 along their upper edges. The lower edges of the strain relief surfaces 23 adjoin a lateral edge of an adjacent mounting surface 21. Preferably, strain relief surfaces 23 are arranged in a repeating pattern such that each strain relief surface 23 of the pair is parallel to corresponding strain relief surfaces 23 of the remaining pairs. Furthermore, strain relief surfaces 23 are continuous and span plates 17, 19 in the lengthwise direction extending from a forward edge 16 of plates 17, 19 to a rearward edge 18 of plates 17, 19. As shown in the preferred embodiments of FIGS. 1–3 and 5, three fasteners 27 are used to draw plates 17, 19 together and four fiber optic cables 11 are located between the four sets of opposed strain relief surfaces 23.

To strain relieve cables 11, each cable 11 is inserted between plates 17, 19 and oriented so that the plane defined by its major axis dimension is parallel to the planes defined by the corresponding opposed strain relief surfaces 23. Once all of the cables 11 are so positioned, fasteners 27 are tightened to produce a compressive force on cables 11. The compressive force produces a frictional gripping force between the outer sheath 13 of the cable 11 and the corresponding opposed strain relief surfaces 23. A spacer 28 may be located between plates 17, 19 to maintain the distance "h" between plates 17, 19 when fasteners 27 are tightened, and thereby prevent the cables 11 from being crushed and damaged.

Figure 2:
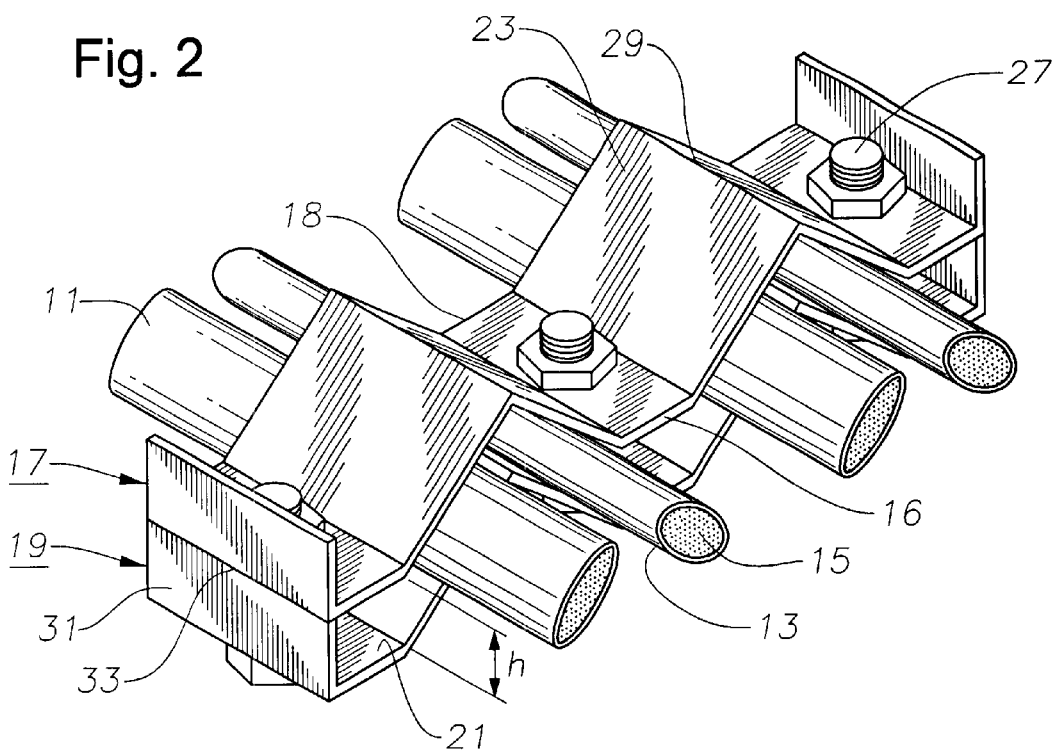
FIG. 2 is a perspective view of a second embodiment of a strain relief apparatus constructed in accordance with the invention.

FIG. 2 shows a second embodiment of a strain relief apparatus according to the invention. In the alternative embodiment shown in FIG. 2, mechanical stops 31 are provided on the lateral edges of plates 17, 19. Mechanical stops 31 may be used in place of, or in addition to, spacers 28 to prevent damage to cables 11 caused by over-tightening fasteners 27. Preferably, mechanical stops 31 are flanges depending perpendicularly from mounting surfaces 21 along the outer lateral edges of plates 17, 19. However, mechanical stops 31 may also be provided at one or more locations between each pair of opposed mounting surfaces 21. The upper edge 33 of mechanical stops 31 on plate 19 are positioned to abut the underside of the opposed mounting surface 21 on plate 17. Stops 31 have a height sufficient to limit the distance h between plates 17, 19 to prevent cables 11 from being damaged by over-tightening fasteners 27.

Figure 3:
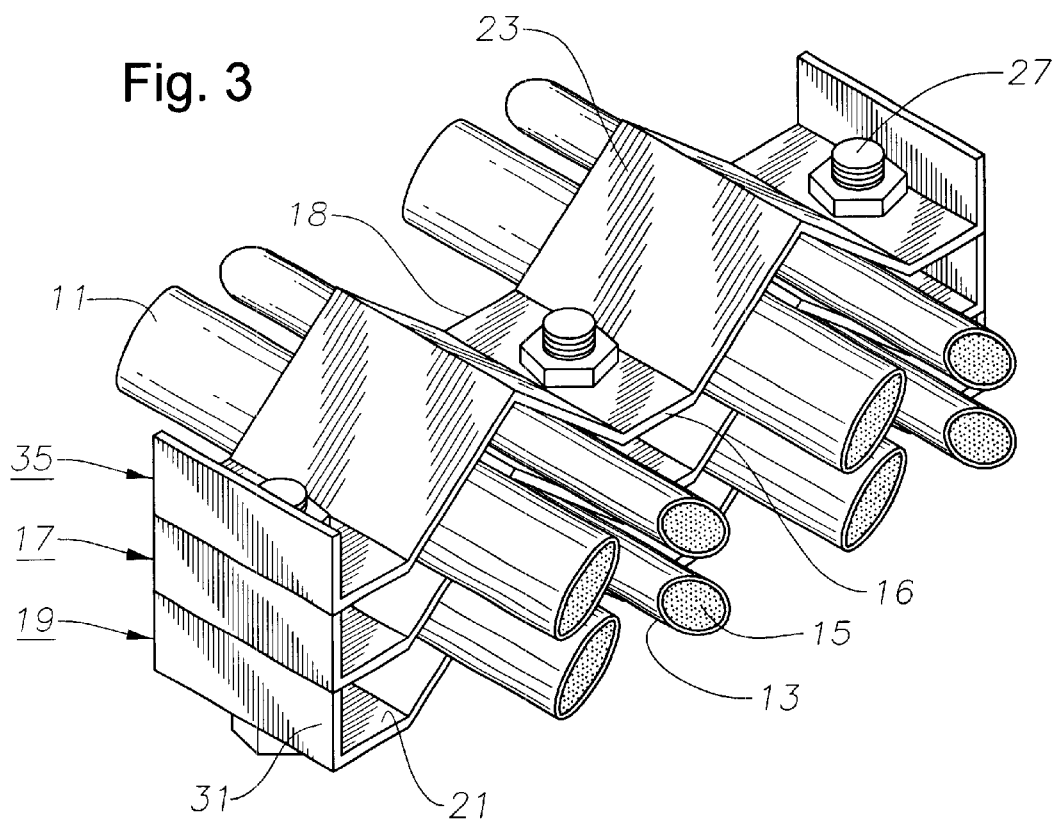
FIG. 3 is a perspective view of a third embodiment of a strain relief apparatus constructed in accordance with the invention.

FIG. 3 shows a third embodiment of a strain relief apparatus according to the invention. As shown in FIG. 3, a plurality of plates may be assembled together to strain relieve additional cables 11 using a strain relief apparatus having a predetermined lateral dimension. Two plates 17, 19 with four cables 11 positioned between the plates 17, 19 are first assembled, as described above. A third plate 35 is then placed on top of plate 17 with four additional cables 11 positioned on the strain relief surfaces 23 between plate 35 and plate 17. The assembly may comprise plates 17, 19, 35 with mechanical stops 31 (as shown), without mechanical stops 31 or spacers 28, or with both mechanical stops 31 and spacers 28. The length of fasteners 27 is extended as necessary to accommodate the increased distance between the underside of plate 19 and the topside of plate 35.

Figure 4:
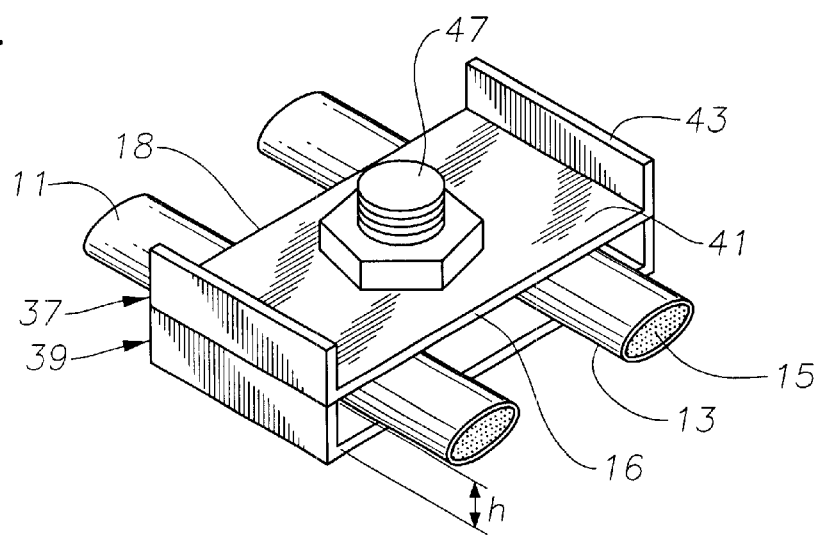
FIG. 4 is a perspective view of a fourth embodiment of a strain relief apparatus constructed in accordance with the invention.

FIG. 4 shows a fourth embodiment of a strain relief apparatus according to the invention. As shown in FIG. 4, the strain relief apparatus comprises an upper plate 37 and a lower plate 39, the plates 37, 39,being oriented adjacent one another. Plates 37, 39. are preferably made of formed metal, such as thin gauge sheet metal, but may be made of any rigid material, for example, hard plastic. As shown, plates 37, 39 have an identical structural configuration and are each formed to have a generally planar base surface 41. In this embodiment, base surface 41 functions as both a mounting surface and a strain relief surface. The base surfaces 41 of the plates 37, 39 are generally parallel and each base surface 41 has a hole (not shown) formed therethrough at an interior location on base surface 41 for receiving a fastener 47. Fastener 47 is preferably an externally threaded bolt and internally threaded nut, but may by any suitable mechanical fastener, such as an internally threaded shaft and externally threaded screw or a snap fitting. Alternatively, fastener 47 may be a conventional cable wrap or cable tie. Preferably, mechanical stops 43 of the type previously described depend perpendicularly from base surfaces 41 along the lateral edges of plates 37, 39. Mechanical stops 43 provide for a minimum distance h between the opposed mounting surfaces 41 of plates 37, 39 when fastener 47 is tightened, and thereby prevent damage to the cables 11 positioned between the plates 37, 39.

Figure 5:
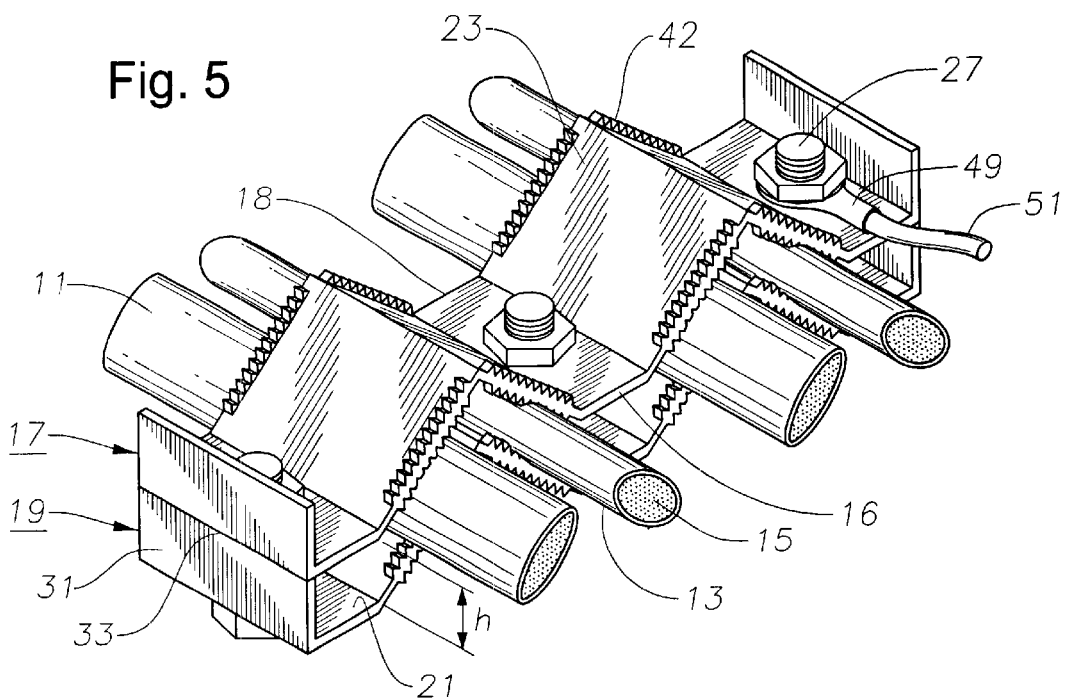
FIG. 5 is a perspective view of a fifth embodiment of a strain relief apparatus constructed in accordance with the invention.

FIG. 5 shows a fifth embodiment of a strain relief apparatus according to the invention. In this embodiment, the plates 17, 19 further comprise a plurality of laterally extending teeth 42 provided along the forward edge 16 and the rearward edge 18 of the strain relief surfaces 23 for securely gripping cables 11. As shown, teeth 42 depend upwardly and downwardly from each strain relief surface 23. However, teeth 42 may depend only upwardly or only downwardly from each strain relief surface 23 without seriously compromising the frictional griping force between the cable 11 and the opposed strain relief surfaces 23. When plates 17, 19 are assembled with cables 11 therebetween as described above, teeth 42 pierce the outer sheath 13 of each cable 11 to increase the frictional gripping force applied to the cables 11. Cables 11 may further comprise an electrically conductive inner sheath or conductor (not shown) located between the optical fibers 15 and the outer sheath 13. In such case, teeth 42 pierce outer sheath 13 and contact the conductive inner sheath. Plates 17, 19 may then be connected to ground using a connector 49 and ground strap 51 to ground cables 11. As previously discussed, plates 17, 19 may comprise mechanical stops 31 and/or spacers 28 to maintain the minimum distance h between plates 17, 19, and thereby prevent damage to the cables 11.

Figure 6:
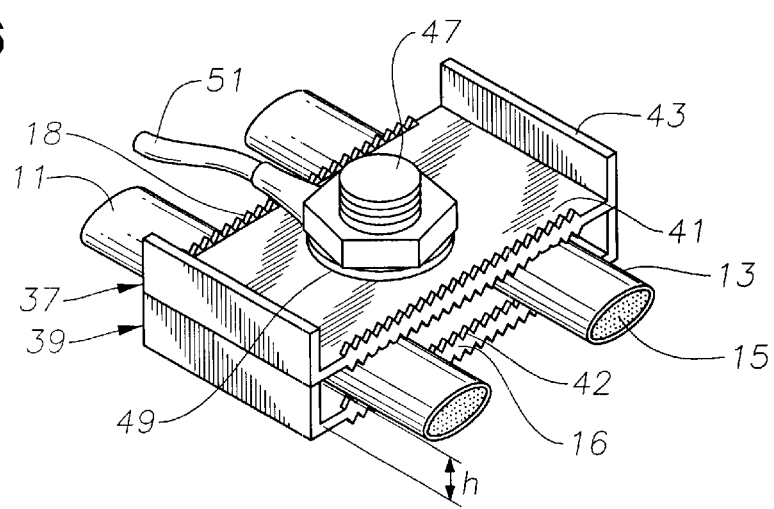
FIG. 6 is a perspective view of a sixth embodiment of a strain relief apparatus constructed in accordance with the invention.

FIG. 6 shows a sixth embodiment of a strain relief apparatus according to the invention. As shown in FIG. 6, plates 37, 39 are provided with laterally extending teeth 42 along the forward edges 16 and the rearward edges 18 of the plates 37, 39. As previously described, teeth 42 pierce outer sheath 13 of the cables 11 to increase the frictional gripping force applied to the cables 11 and/or to contact the inner conductive sheath of cable 11. If desired, plates 37, 39 are then connected to ground using connector 49 and ground strap 51, as previously described.

The various embodiments of the invention described and shown herein permit communications cables having a non-cylindrical cross section, such a flat cable or an elliptical cable, to be reliably strain relieved. The invention further permits more than one cable to be strain relieved and positioned in a non-planar orientation between two adjacent plates. The advantage realized from a non-planar orientation of the cables is that a greater number of cables can be accommodated by a strain relief apparatus having a predetermined lateral dimension or within the base of an existing enclosure. In addition, the invention permits a plurality of plates to be assembled together so that multiple layers of cables can be strain relieved in a non-planar orientation.

While the invention has been shown in only four of its forms, it should be apparent to those skilled in the art that it is not so limited, and thus, is susceptible to additional embodiments not expressly shown or described herein without departing from the intended scope of the invention.

That which is claimed is:

1. An apparatus for strain relieving a non-cylindrical cable, the apparatus comprising:

at least two plates, each plate having at least one generally planar mounting surface and at least one strain relief surface that adjoins the at least one mounting surface and defines a plane that is angled relative to the mounting surface, the plates oriented adjacent one another with the mounting surfaces parallel and opposing one another and the strain relief surfaces parallel and opposing one another, and wherein the cable is received between the opposed strain relief surfaces; and a fastener that extends between the opposing mounting surfaces for drawing the plates together to frictionally grip the cable between the opposing strain relief surfaces.

2. The apparatus of claim 1 wherein the at least one strain relief surface of each plate is continuous and extends between a lateral forward edge of the plate and a lateral rearward edge of the plate.

3. The apparatus of claim 1 wherein
the at least one mounting surface of each plate comprises a pair of mounting surfaces, each of the mounting surfaces located at a lateral end of the plate; and
the at least one strain relief surface of each plate comprises a pair of strain relief surfaces located between the mounting surfaces, a lower edge of each strain relief surface adjoining one of the mounting surfaces and the upper edges of the strain relief surfaces converging to a define a lengthwise peak between the mounting surfaces.

4. The apparatus of claim 1 wherein the at least one mounting surface of each plate comprises a pair of mounting surfaces, each of the mounting surfaces located at a lateral end of the plate; and
the at least one strain relief surface of each plate comprises a plurality of pairs of strain relief surfaces located between the mounting surfaces, the upper edges of each of the pairs of strain relief surfaces converging to a define a lengthwise peak between the mounting surfaces.

5. The apparatus of claim 1 further comprising a plurality of laterally extending teeth depending from the at least one strain relief surface of each plate to increase the frictional gripping force applied between the cable and the strain relief surface.

6. An apparatus for strain relieving a cable, the apparatus comprising:
at least two plates, each of the plates comprising a base surface and a pair of lateral ends, the base surface comprising at least two mounting surfaces and at least two strain relief surfaces located between the mounting surfaces and angled relative to the mounting surfaces, the plates oriented adjacent one another with the base surfaces opposing one another;
at least one fastener that extends between the base surfaces for drawing the plates together to Fictionally grip the cable therebetween; and
a plurality of mechanical stops located on the lateral ends of at least one of the plates for contacting the underside of one of the opposing base surfaces of one of the plates, the stops maintaining a minimum distance between the base surfaces of the plates when the plates are drawn together by the at least one fastener wherein the mounting surfaces are parallel and opposed and wherein the strain relief surfaces are parallel and opposed.

7. The apparatus of claim 6 wherein the mounting surfaces of each plate are generally planar and wherein the strain relief surfaces of each plate are generally planar.

8. The apparatus of claim 6 wherein each of the mechanical stops comprises a flange depending from the base surface along the lateral ends of the plate.

9. The apparatus of claim 6 wherein the at least two strain relief surfaces comprises a plurality of pairs of strain relief surfaces located between the mounting surfaces, each of the pairs of strain relief surfaces having upper edges that converge to a lengthwise peak between the mounting surfaces.

10. The apparatus of claim 9 wherein at least one of the plurality of mechanical stops is located on each of the mounting surfaces.

11. The apparatus of claim 6 further comprising a plurality of laterally extending teeth depending from the base surface of at least one of the plates to increase the frictional gripping force applied between the cable and the base surface.

12. The apparatus of claim 6 further comprising an electrically conductive ground strap connected to the at least one fastener for grounding the cable.

13. An apparatus for strain relieving a plurality of cables, the apparatus comprising:
at least two plates oriented adjacent one another, each of the plates comprising a plurality of coplanar mounting surfaces and a plurality of pairs of non-coplanar strain relief surfaces having upper edges that converge to define a lengthwise peak, the strain relief surfaces defining planes that are angled relative to the mounting surfaces, the mounting surfaces of the plates opposing one another and the pairs of strain relief surfaces opposing one another;
a fastener extending between at least two of the opposing mounting surfaces of the plates for drawing the plates together with the cables positioned between the opposing strain relief surface wherein the opposed mounting surfaces are parallel and wherein the opposed strain relief surfaces are parallel.

14. The apparatus of claim 13 further comprising
a plurality of mechanical stops located on the mounting surfaces of at least one of the plates for contacting the mounting surfaces of the other of the plates, the mechanical stops maintaining a minimum distance between the opposing strain relief surfaces of the plates when the plates are drawn together by the at least one fastener.

15. A method of strain relieving a non-cylindrical cable, the method comprising the steps of:
providing at least two plates, each of the plates having at least one generally planar mounting surface and at least one strain relief surface adjoining the mounting surface and defining a plane that is angled relative to the mounting surface;
orienting the plates adjacent one another such that the mounting surfaces are opposed and parallel to each other and the strain relief surfaces are opposed and parallel to each other,
inserting at least one cable between the opposed strain relief surfaces;
inserting a fastener between the opposed mounting surfaces; and
drawing the plates together with the fastener to apply a frictional gripping force between the cable and the opposed strain relief surfaces and to frictionally grip the cable between the opposed strain relief surfaces.

16. The method according to claim 15 comprising the further steps of:
providing a plurality of laterally extending teeth depending from the at least one strain relief surface to increase the frictional gripping force applied to the cable; and
providing a grounding strap connected to the at least one fastener for grounding the cable.

* * * * *